(12) United States Patent
Choi

(10) Patent No.: US 6,256,164 B1
(45) Date of Patent: Jul. 3, 2001

(54) ADJUSTMENT MECHANISM FOR SERVO TRACK WRITER FOR USE IN HARD DISC DRIVE

(75) Inventor: Sang Jin Choi, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/274,928

(22) Filed: Mar. 23, 1999

(30) Foreign Application Priority Data

Feb. 25, 1999 (KR) .................................................. 99-6331

(51) Int. Cl.$^7$ .................................................. G11B 5/012
(52) U.S. Cl. .......................................... 360/97.01; 360/75
(58) Field of Search ...................... 360/75, 97.01–99.11

(56) References Cited

U.S. PATENT DOCUMENTS

| | | |
|---|---|---|
| 4,531,167 | 7/1985 | Berger . |
| 4,831,470 * | 5/1989 | Brunnett ................................. 360/75 |
| 4,980,783 * | 12/1990 | Moir ................................. 360/98.01 |
| 5,617,267 * | 4/1997 | Kawagoe ........................... 360/98.07 |
| 5,760,989 | 6/1998 | Colban . |
| 5,796,541 | 8/1998 | Stein et al. . |

* cited by examiner

*Primary Examiner*—A. J. Heinz
(74) *Attorney, Agent, or Firm*—Burns, Doane, Swecker & Mathis, L.L.P.

(57) ABSTRACT

A servo track writer for use in a hard disc drive is provided, which includes a plate-shaped base member, a hard disc drive fixed on the upper surface of the base member, and a clock head unit spaced by a predetermined distance apart from the hard disc drive, for recording and reading out a clock signal on and from the hard disc drive, respectively. The servo track writer includes a sliding transfer unit for transferring the clock head unit toward or far from the hard disc drive, and an adjusting screw which extends from one side of a supporting member supporting the clock head unit toward the hard disc drive and adaptively contacts the side surface of the hard disc drive functioning as a stopper when the clock head unit moves toward the hard disc drive. The servo track writer can maintain the constant distance between a clock head unit and the hard disc drive since the adjusting screw installed in the supporting member supporting the clock head unit adaptively contacts one side of the hard disc drive functioning as a stopper, although the hard disc drive moves by a certain distance apart from the clock head unit due to an external force, to thereby detect a clock signal recorded on the hard disc drive with ease.

8 Claims, 3 Drawing Sheets

ADJUSTMENT MECHANISM FOR SERVO TRACK WRITER FOR USE IN HARD DISC DRIVE

BACKGROUND OF THE INVENTION

1. Field of the Invention

The present invention relates to a servo track writer for use in a hard disc drive, and more particularly, to a servo track writer for use in a hard disc drive, in which the distance between a clock head unit and the hard disc drive can be maintained constant although the hard disc drive moves by a certain distance apart from the clock head unit due to an external force, to thereby detect a clock signal recorded on the hard disc drive with ease.

2. Description of the Related Art

A hard disc drive is one of larg-capacity auxiliary storage devices which are used in a computer. The hard disc drive is comprised of a plurality of circular discs which are spaced by a predetermined distance apart from and stacked over each other, and a plurality of head arms which are rotatably assembled between the discs, to write information on the discs and read information from the discs.

A single disc includes a plurality of concentric tracks on the surface of it. Each concentric track is divided into one or more sectors in which the data is recorded. Servo information such as a track number, a sector number, a head number (disc number), and position control information is recorded on a certain area of each track. The servo information becomes a reference that information is recorded on the disc or information is read therefrom. A device for recording a clock signal and servo information on the hard disc drive in this way is called a servo track writer.

FIG. 3 is a perspective view of a conventional servo track writer for a hard disc drive. As shown, the servo track writer includes a plate-shaped base member 101, a hard disc drive 105 which is fixed on the upper surface of the base member 101 by a plurality of fixing members, a clock head unit 107 spaced by a predetermined distance apart from the hard disc drive 105, and a sliding transfer unit 119 for transferring the clock head unit 107 toward or away from the hard disc drive 105.

A guide rail 109 is protruded and formed on the base member 101 to guide the clock head unit 107 to slide toward the hard disc drive 105. A groove which is engaged with the guide rail 109 is formed on the bottom of a support member 185 supporting the clock head unit 107.

A plurality of discs 113 are spaced apart and stacked over each other in the hard disc drive 105. A head arm 129 for writing information on the discs 113 or reading information from the discs 113 is rotatably installed between the discs 113.

On the upper area of the clock head unit 107 is installed a clock head arm 117 for recording and reading out a clock signal on and from the discs 113 which are rotatably loaded.

Also, the sliding transfer unit 119 includes a driving motor 121 fixedly installed on the base member 101 and spaced apart from the clock head unit 107 by a predetermined distance, a ball screw portion 163 which is rotated by the driving motor 121, and a protruding member 165 extending from the supporting member 164 and threadedly engaged with the ball screw 163.

Meanwhile, a stopper 167 protruding upward from the base member 101 is disposed between the clock head unit 107 and the hard disc drive 105. An adjusting screw 169 which contacts the stopper 167 is provided on the supporting member 164, to limit an access to the hard disc drive 105 when the clock head unit 107 gains access to the hard disc drive 105.

When the hard disc drive 105 is loaded on the base member 101 to write servo information on discs, two horizontal pressing motors 133 operate to press the hard disc drive 105 toward flexing location bars 131. Accordingly, the hard disc drive 105 moves horizontally to the top and the right, and securely contacts the side surfaces of the fixing bars 131. Then, three vertical pressing motors 135 operate to press the hard disc drive 105 vertically to securely contact the upper surface of the base member 101.

When the hard disc drive 105 is fixed on the base member 101 as in the above structure, the driving motor 121 rotates in order to input a clock signal to the track of the discs 113 provided in the hard disc drive 105. As a result, the ball screw 163 is threadedly engaged with the ball threads of the protruding member 165 and rotates, to thereby cause the clock head unit 107 to gain access to the hard disc drive 105. The clock head unit 107 moving toward the hard disc drive 105 does not proceed any more and stops as the adjusting screw 169 connected to the supporting member 164 contacts the stopper 167. When the clock head unit 107 stops, the clock head arm 117 descends toward the discs 113 and the discs 113 of the hard disc drive 105 rotate. As a result, a clock signal is written on a certain area of a track.

When the discs 113 rotate, the clock head arm 117 detects the clock signal recorded on the particular area of the disc track. As the clock signal is detected, the head arm 129 of the hard disc drive 105 writes servo information on the discs 113.

Accordingly, the head arm 129 can write servo information only when a clock signal has been detected. In this way, servo information can be recorded on a certain area of the discs 113.

However, after a clock signal has been recorded on a certain area of the disc track by the clock head arm in the conventional servo track writer, if the hard disc drive is moved by an external force, the clock head arm cannot read the clock signal input to the disc even in the case that servo information tends to be recorded on the disc.

This occurs due to the problem that the distance between the hard disc drive and the clock head unit is varied since the hard disc drive moves independently off the clock head unit. Thus, the whole servo information is recorded on the hard disc drive distortedly, to thereby lower the quality of the hard disc drive.

In addition, since the ball screw in the sliding transfer unit for slidingly transferring the clock head unit is threadedly engaged with the protruding member extended from the support member of the clock head unit, an error in the recording and reading of the clock signal can occur due to a mechanical error such as a backlash.

SUMMARY OF THE INVENTION

To solve the above problems, it is an object of the present invention to provide a servo track writer for use in a hard disc drive, in which the distance between a clock head unit and the hard disc drive can be maintained constant since an adjusting screw installed in a supporting member supporting a clock head unit adaptively contacts the side surface of a hard disc drive functioning as a stopper, although the hard disc drive moves by a certain distance apart from the clock head unit due to an external force, to thereby detect a clock signal recorded on the hard disc drive with ease.

To accomplish the above object of the present invention, there is provided a servo track writer for use in a hard disc drive, having a plate-shaped base member, a hard disc drive fixed on the upper surface of the base member, and a clock head unit spaced by a predetermined distance apart from the hard disc drive, for recording and reading out a clock signal on and from the hard disc drive, respectively, the servo track writer comprising: a sliding transfer unit for transferring the clock head unit toward or far from the hard disc drive; and an adjusting screw which extends from one side of a supporting member supporting the clock head unit toward the hard disc drive and adaptively contacts the side surface of the hard disc drive functioning as a stopper when the clock head unit moves toward the hard disc drive.

Here, a guide rail is protrudingly installed on the base member and a groove engaging with the guide rail is formed on the supporting member of the clock head unit, to thereby cause the clock head unit to slide toward the hard disc drive.

Preferably, the sliding transfer unit comprises a driving motor spaced by a predetermined distance apart from one side of the supporting member and fixed to the base member; a pinion rotating by the driving motor; and a rack which is toothedly engaged with the pinion.

It is preferable that power is consistently supplied to the driving motor in such a manner that the adjusting screw contacts the side surface of the hard disc drive when the clock head unit performs recording and reading of a clock signal.

It is also preferable that the adjusting screw is adjustably installed on the one side of the supporting member.

BRIEF DESCRIPTION OF THE DRAWINGS

The object and other advantages of the present invention will become more apparent by describing in detail the structures and operations of the present invention with reference to the accompanying drawings, in which.

DETAILED DESCRIPTION OF THE INVENTION

Preferred embodiments of the present invention will be described in detail with reference to the accompanying drawings.

Figure 1:
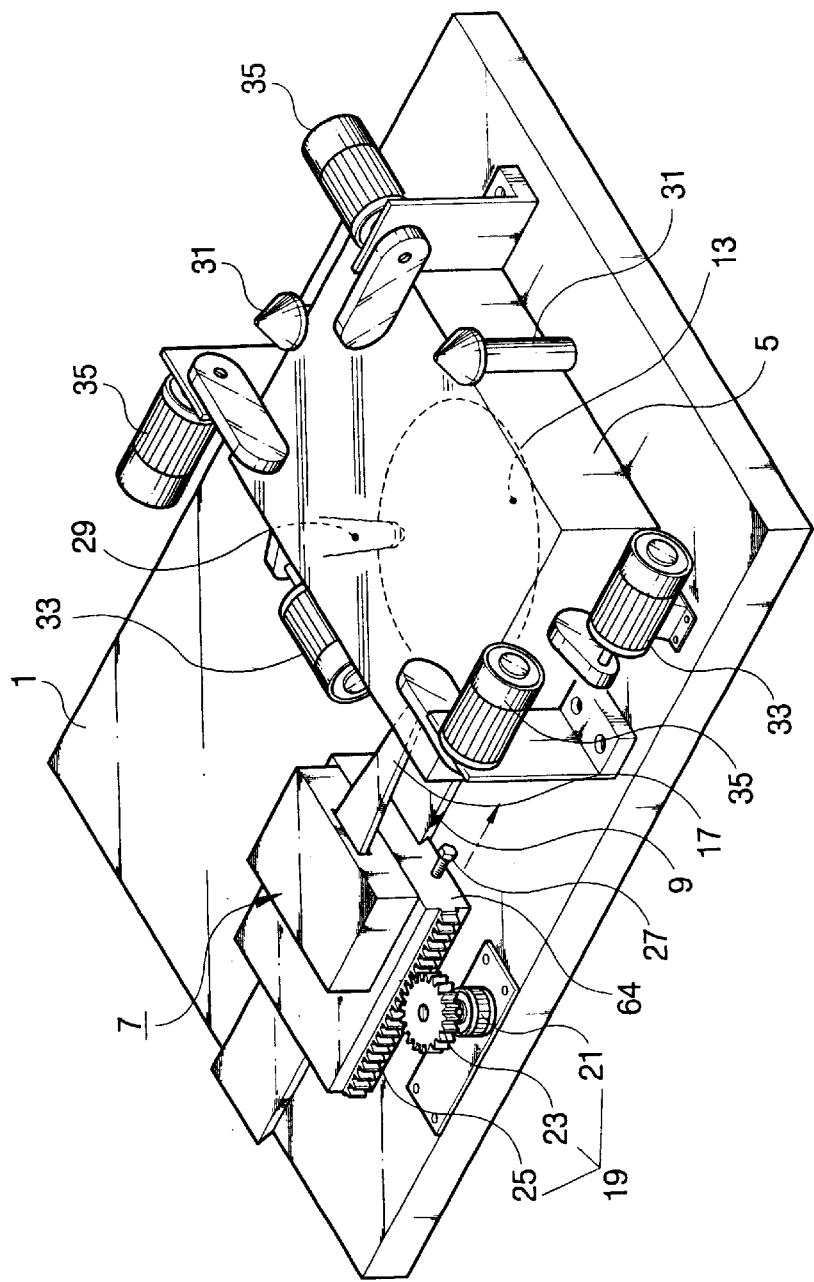
FIG. 1 is a perspective view of a servo track writer for use in a hard disc drive according to the present invention.
Figure 2:
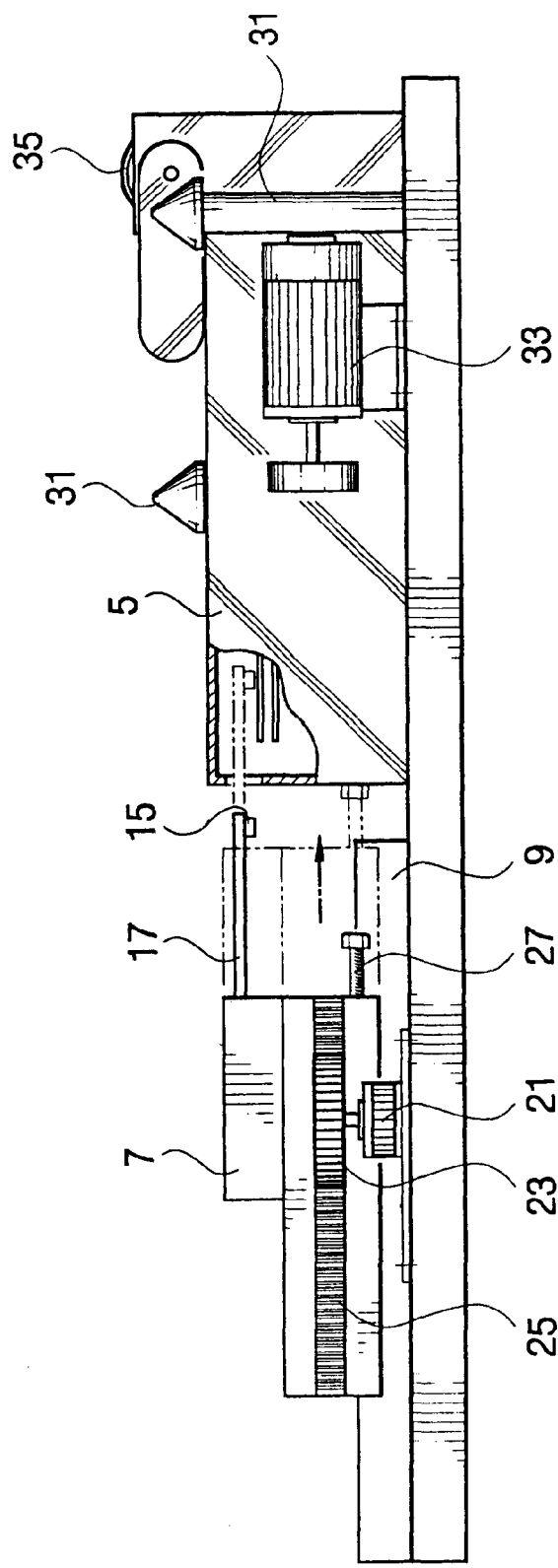
FIG. 2 is a front view of FIG. 1.
Figure 3:
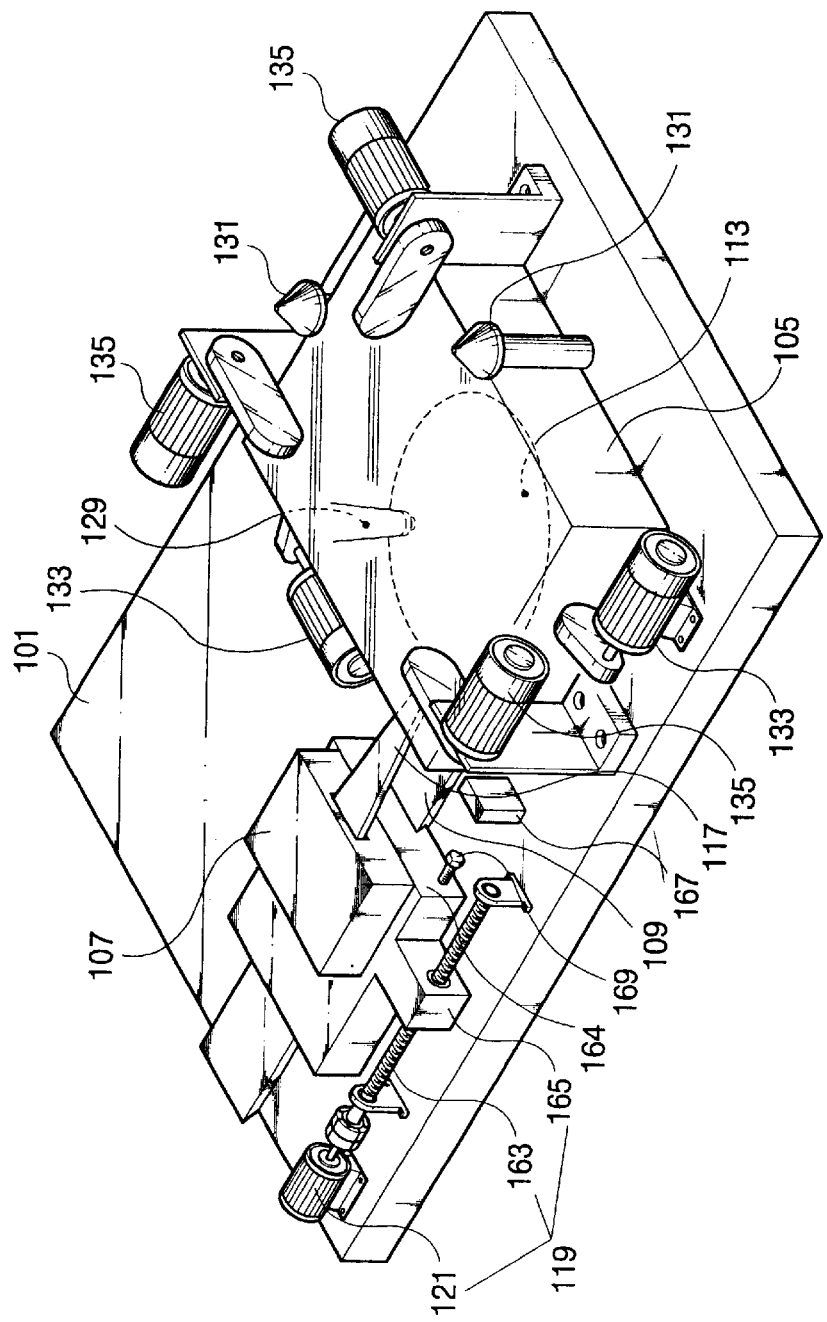
FIG. 3 is a perspective view of a conventional servo track writer for use in a hard disc drive.

As shown in FIGS. 1 and 2, the servo track writer includes a plate-shaped base member 1, a hard disc drive 5 which is fixed on the upper surface of the base member 1, and a clock head unit 7 spaced by a predetermined distance apart from the hard disc drive 5. A plurality of rotatable discs 13 and a head arm 29 for writing information on the discs 13 and reading the written information from the discs 13 are installed in the hard disc drive 5.

To fix the hard disc drive 5, the servo track writer for use in a hard disc drive according to a preferred embodiment of FIG. 1 includes fixing bars 31 protruding upward from the base member 1 in the top and right side of the hard disc drive 5, two horizontal pressing motors 33 operating to press the hard disc drive 5 toward the fixing bars 31, and three vertical pressing motors 35 operating to press the hard disc drive 5 vertically toward the upper surface of the base member 1.

A guide rail 9 is protruded and formed on the base member 1 to guide the clock head unit 7 to slide toward the hard disc drive 5. A groove which is engaged with the guide rail 9 is formed on the bottom surface of a support member 64 supporting the clock head unit 7.

A clock head arm 17 is provided with a head 15 on the end of the upper area of the clock head unit 7, so that a clock signal can be recorded and read on and from the rotatable discs 13, respectively.

Meanwhile, the sliding transfer unit 19 is provided in one side of the clock head unit 7, in order to transfer the clock head unit 7 toward or far from the hard disc drive 5.

The sliding transfer unit 19 comprises a driving motor 21 spaced by a predetermined distance apart from one side of the supporting member 64 and fixed to the base member 1, a pinion 23 rotating by the driving motor 21, and a rack 25 which is formed in one side of the supporting member 64 and toothedly engaged with the pinion 23.

Meanwhile, an adjusting screw 27 which extends toward the hard disc drive 5 to limit an access distance when the clock head unit 7 gains access to the hard disc drive 5 by the sliding transfer unit is provided in one side of the supporting member 64 of the clock head unit 7 opposing the hard disc drive 5.

When the hard disc drive 5 is mounted on the base member 1 to write servo information on discs, two horizontal pressing motors 33 operate to press the hard disc drive 5 toward fixing location bars 31. Accordingly, the hard disc drive 5 moves horizontally to the top and the right, and securely contacts the side surfaces of the fixing bars 31. Then, three vertical pressing motors 35 operate to press the hard disc drive 5 vertically to securely contact the upper surface of the base member 1.

When the hard disc drive 5 is fixed as in the above structure, the driving motor 21 rotates to record a clock signal on the discs. The pinion 23 rotates according to the rotation of the driving motor 21. The rotational movement of the pinion 23 is transformed into a linear movement by the rack 25 which is toothedly engaged with the pinion 23, to thereby cause the clock head unit 7 to slide toward the hard disc drive 5 along the guide rail 9 formed on the base member 1. In this manner, during the time when the clock head unit 7 moves by a predetermined distance toward the hard disc drive 5, the adjusting screw 27 contacts one side of the hard disc drive 5 and stops.

When the clock head unit 7 stops at a predetermined position, the discs 13 rotate in the hard disc drive 5. Then, a dock signal is recorded on a certain area of the disc track via a head 15 provided in the end of the clock head arm 17.

When the clock signal has been completely recorded, the head 15 provided in the clock head arm 17 detects the clock signal recorded on the track of the discs 13. As the clock signal is detected, the head arm 29 provided in the hard disc drive 5 writes servo information on a certain area of the disc track.

In this process, even of the hard disc drive 5 is moved by an external force or vibration, the driving motor 21 operates continuously in such a manner that the adjusting screw 27 contacts one side surface of the hard disc drive 5 functioning as a stopper. Thus, the movement of the clock head unit 7 is adapted to the movement of the hard disc drive 5. As a result, the distance between the clock head unit 7 and the hard disc drive 5 is consistently maintained at a constant interval, the same as the length of the adjusting screw 27. Thus, the head 15 of the clock head arm 17 can detect the clock signal recorded on the disc 13 without miss.

Therefore, the servo track writer according to the present invention can write servo information on a certain area of the disc track to suppress recording quality degradation of the hard disc. The sliding transfer unit comprised of a pinion and a rack can suppress a mechanical error such as backlash occurring in the conventional ball screw.

As described above, in the servo track writer according to the present invention, the distance between a clock head unit and the hard disc drive can be maintained constant since the adjusting screw installed in the supporting member supporting the clock head unit adaptively contacts one side of the hard disc drive functioning as a stopper, although the hard disc drive moves by a certain distance apart from the clock head unit due to an external force, to thereby detect a clock signal recorded on the hard disc drive with ease.

What is claimed is:

1. A servo track writer for use in a hard disc drive, having a plate-shaped base member, a hard disc drive fixed on the upper surface of the base member, and a clock head unit spaced by a predetermined distance apart from the hard disc drive, for recording and reading out a clock signal on and from the hard disc drive, respectively, the servo track writer comprising:

a sliding transfer unit for transferring the clock head unit toward or from the hard disc drive; and an adjusting screw which extends from one side of a supporting member supporting the clock head unit toward the hard disc drive and contacts a side surface of the hard disc drive functioning as a stopper when the clock head unit moves toward the hard disc drive, wherein the supporting member adapts to movements of the hard disc drive relative to the base member.

2. The servo track writer according to claim 1, wherein a guide rail is protrudingly installed on the base member and a groove engaging with the guide rail is formed on the supporting member of the clock head unit.

3. The servo track writer according to claim 2, wherein said sliding transfer unit comprises a driving motor spaced by a predetermined distance apart from one side of the supporting member and fixed to the base member; a pinion rotating by the driving motor; and a rack which is toothedly engaged with the pinion.

4. The servo track writer according to claim 3, wherein power is consistently supplied to the driving motor in such a manner that the adjusting screw adaptively contacts the side surface of the hard disc drive when the clock head unit performs recording and reading of a clock signal.

5. The servo track writer according to claim 1, wherein said adjusting screw is adjustably installed on the one side of the supporting member.

6. A servo track writer for use in a hard disc drive, the servo track writer comprising:

a plate-shaped base member;

a hard disc drive fixed on the upper surface of the base member;

a clock head unit spaced by a predetermined distance apart from the hard disc drive, for recording and reading out a clock signal on and from the hard disc drive, respectively;

a supporting member installed on the bottom of the clock head unit, supporting the clock head unit;

a sliding transfer unit for transferring the clock head unit together with the support member toward or from the hard disc drive;

an adjusting screw which extends from one side of the supporting member toward the hard disc drive and contacts a side surface of the hard disc drive functioning as a stopper when the clock head unit moves toward the hard disc drive, wherein the supporting member adapts to movements of the hard disc drive relative to the base member.

7. The servo track writer according to claim 1 wherein the hard disc drive is slidably disposed on the base member, and further including a locating structure fixed on the base member, wherein the hard disc drive is pressed against the locating structure.

8. The servo track writer according to claim 6 wherein the hard disc drive is slidably disposed on the base member, and further including a locating structure fixed on the base member, wherein the hard disc drive is pressed against the locating structure.

* * * * *